United States Patent [19]

Post et al.

[11] Patent Number: 4,503,290

[45] Date of Patent: Mar. 5, 1985

[54] AUTOMATIC LINE SUPERVISOR FOR USE WITH A CALL CONCENTRATOR

[75] Inventors: Kendall E. Post; Paul N. Henning, both of Madison, Wis.

[73] Assignee: Amtel Communications, Inc., Madison, Wis.

[21] Appl. No.: 369,912

[22] Filed: Apr. 19, 1982

[51] Int. Cl.³ .......................... H04M 3/50; H04Q 3/60
[52] U.S. Cl. .......................... 179/18 FC; 179/27 FH
[58] Field of Search ........... 179/18 FC, 27 FH, 27 A, 179/27 D, 27 FG, 175.2 C, 18 BE

[56] References Cited

U.S. PATENT DOCUMENTS

| | | | |
|---|---|---|---|
| 4,256,928 | 3/1981 | Lesea et al. | 179/18 BE |
| 4,355,207 | 10/1982 | Curtin | 179/18 FC |
| 4,375,582 | 3/1983 | Gist et al. | 179/27 FH |

OTHER PUBLICATIONS

"ROLM Centralized Attendant Service", ROLM Corporation Brochure, 2 pp., 1979.

Primary Examiner—Thomas W. Brown
Attorney, Agent, or Firm—LeBlanc, Nolan, Shur & Nies

[57] ABSTRACT

An automatic line supervisor is disclosed for a telephone system having a line concentrator which converges a plurality of subscriber lines into a single output line to a telephone answering service (TAS) which is coupled to the concentrator by a telephone line with automatic ring down (ringing tie line). In order for the line to properly operate after the TAS has answered a subscriber call, and gone back on hook, the telephone concentrator must be disconnected from the ringing tie line and from the caller. In a first embodiment, the automatic line supervisor is an integral part of the concentrator and operates to make the requisite disconnection of the concentrator from the ringing tie line and the caller on a subscriber line by monitoring the tie line for appropriate audio tones, generating a control signal either in response to the presence of a dial tone for a particular time interval or in response to the absence of DTMF tones (dual tone multifrequency) for a particular time interval. The control signal is used to open appropriate relays to disconnect the line concentrator from the caller and the ringing tie line to prepare the ringing tie line for ringing the TAS that another call is present. In the second embodiment, the automatic line supervisor is a separate device which is located at the TAS. The second embodiment monitors the current flow in the ringing tie line coupling the telephone concentrator with the TAS to sense the discontinuance of current flow which is indicative of the operator going on hook. When the discontinuance of current flow is sensed, a control signal is produced which is coupled to the telephone concentrator via the tie line. The control signal is sensed at the concentrator and initiates the opening of the requisite switches to disconnect the concentrator from the ringing tie line and the subscriber line.

3 Claims, 7 Drawing Figures

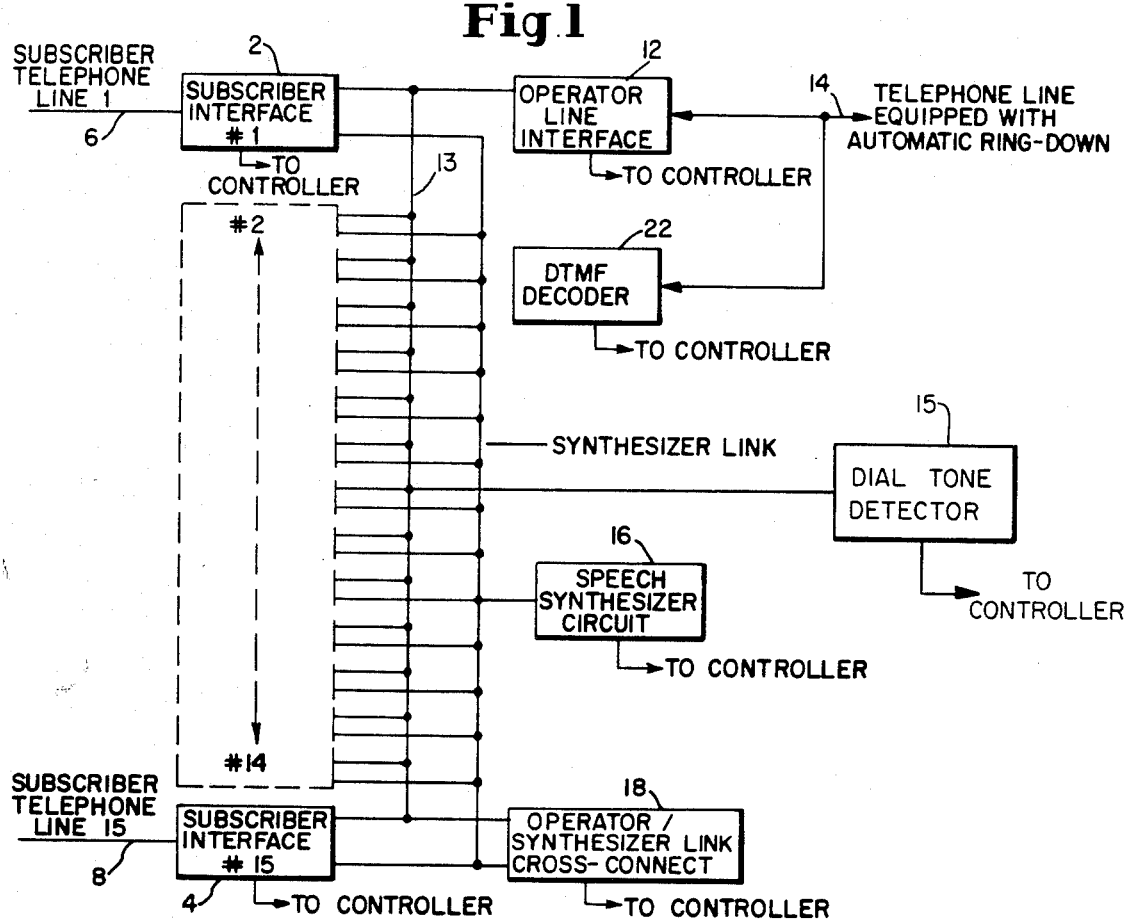
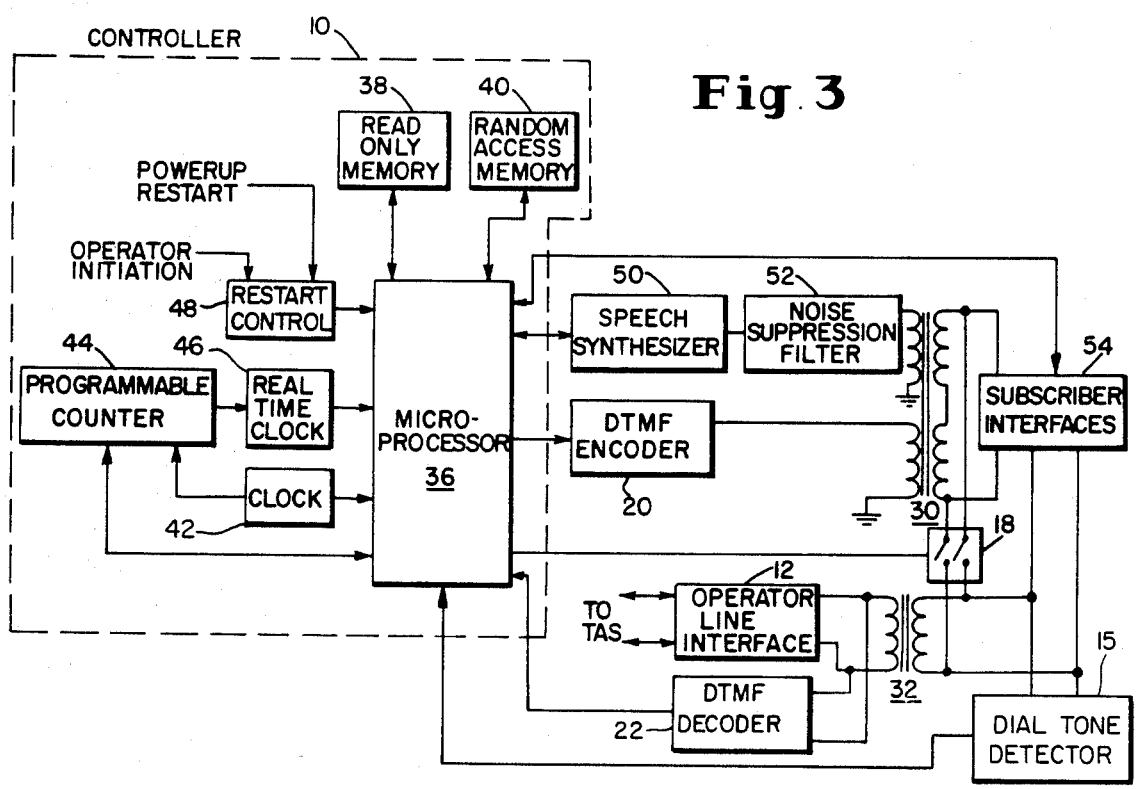

4,503,290

AUTOMATIC LINE SUPERVISOR FOR USE WITH A CALL CONCENTRATOR

BACKGROUND OF THE INVENTION

Cross Reference to Related Application

Reference is made to application Ser. No. 369,915, filed on Apr. 19, 1982, which is entitled AUTOMATIC LINE SUPERVISOR and which names Walter Ziegler as inventor.

FIELD OF THE INVENTION

The invention relates to automatic line supervisors for use in telephone systems having a line concentrator which is coupled to a telephone answering service via a ringing tie line, and to automatic line supervisors designed for use in telephone systems of the type described in copending patent application Ser. No. 154,914, now U.S. Pat. No. 4,355,207. The disclosure of Ser. No. 154,914 entitled TELEPHONE ANSWERING SYSTEM, is incorporated by reference in its entirety.

DESCRIPTION OF THE PRIOR ART

The assignee of the present applicant has sold for more than one year prior to the filing date of the present application and is currently marketing a universal single line concentrator under the trademark LEPRECHAUN. The initial model of the LEPRECHAUN is described in the aforementioned patent application Ser. No. 154,914 which names William J. Curtin as the inventor. Ser. No 154,914 discloses a telephone system in which a single telephone line connects a line concentrator with a TAS. In Ser. No. 154,914 there is no mechanism disclosed for automatically opening the switching mechanisms within the concentrator when the operator has gone on hook after answering a call from the concentrator to thereby effect disconnection of the line concentrator from the ringing tie line and the subscriber to prepare the system for ringing the TAS. In the system disclosed in Ser. No. 154,914, the operator signals the line concentrator to open the switching mechanisms by tone encoded commands in order to enable the concentrator to again ring the TAS when an incoming call is received. The operator generated tone encoded commands which are transmitted by the TAS are decoded in the concentrator by a DTMF decoder to generate a control signal which opens the switching mechanisms. The opening of the switching mechanism is totally dependent upon the operator's issuance of proper commands. If the operator fails to issue a command to open the switching mechanisms, the concentrator cannot ring the operator to answer another call.

An automatic disconnect circuit for disconnecting a remote telephone in response to a hang up click is disclosed in U.S. Pat. No. 4,156,799.

Mechanisms for automatically disconnecting phones in a conference call between three or more parties are used in the Bell telephone system.

SUMMARY OF THE INVENTION

A call concentrator in accordance with the first embodiment includes means for detecting an elapsed time interval during which signal is either present on the tie line coupling the concentrator and the TAS or alternatively an elapsed time interval during which another signal is absent and means for generating a control signal in response to the detection of the elapsed time interval; and switching means coupled to the means for generating a control signal for disconnecting the concentrator from the tie line and a caller whereby the concentrator may ring the TAS to answer another call.

An automatic line supervisor in accordance with this first embodiment, which is the subject matter of copending patent application Ser. No. 369,915, is an integral part of the phone concentrator which is coupled to the TAS via a ringing tie line.

An automatic line supervisor in accordance with the second embodiment, which is the subject matter of the present patent application, includes means for monitoring the telephone line running between the concentrator and the TAS to sense an operator at the TAS going on hook, means responsive to the sensing of the operator going on hook to cause the generation of a control signal and means coupling the control signal to a switching means located within the call concentrator, the control signal causing the switching means to open to permit the call concentrator to ring the TAS to answer another call. The sensing of the operator going on hook is accomplished by detecting a drop in the current level flowing in the telephone line running between the concentrator and the TAS below a threshold level which threshold level is nominally zero. With a conventional ringing tie line, an off hook condition in the TAS causes a closed circuit between the "Ring-In" and "Tip-In" lines to produce a current flow. When the TAS goes back on hook, the circuit within the TAS which connects the "Ring-In" and "Tip-In" is opened causing the current flow to fall to zero. The drop in current level to zero is sensed and used to initiate the generation of a tone by a conventional DTMF encoder. The generated tone is coupled to the telephone circuit and decoded in the concentrator by a conventional DTMF decoder to produce a control signal. The control signal causes a switching mechanism in the concentrator to open to disconnect the concentrator from the subscriber line and the TAS, which permits the concentrator to ring the TAS, to answer another call.

An automatic line supervisor in accordance with this second embodiment is a separate device which is physically placed at the location of the TAS and is connected to a ringing tie line running between the TAS and a call concentrator.

Each of these embodiments has the advantage over the prior art manual system, which requires operator action at the TAS, of automatically supervising the ringing tie line between the concentrator and the TAS so that the concentrator will not be prevented from ringing the TAS if the operator fails to make the requisite command which opens the switching means in the concentrator to disconnect the concentrator from a caller and the tie line. With each of these embodiments, the switching means within the concentrator is automatically opened to enable the concentrator to ring the TAS without requiring the operator to issue a command.

BRIEF DESCRIPTION OF THE DRAWINGS

FIG. 1 is a block diagram of a telephone concentrator which contains an automatic line supervisor;

FIG. 3 is a block diagram of the controller of the concentrator illustrated in FIGS. 1 and 2;

DESCRIPTION OF THE PREFERRED EMBODIMENTS

Figure 2:
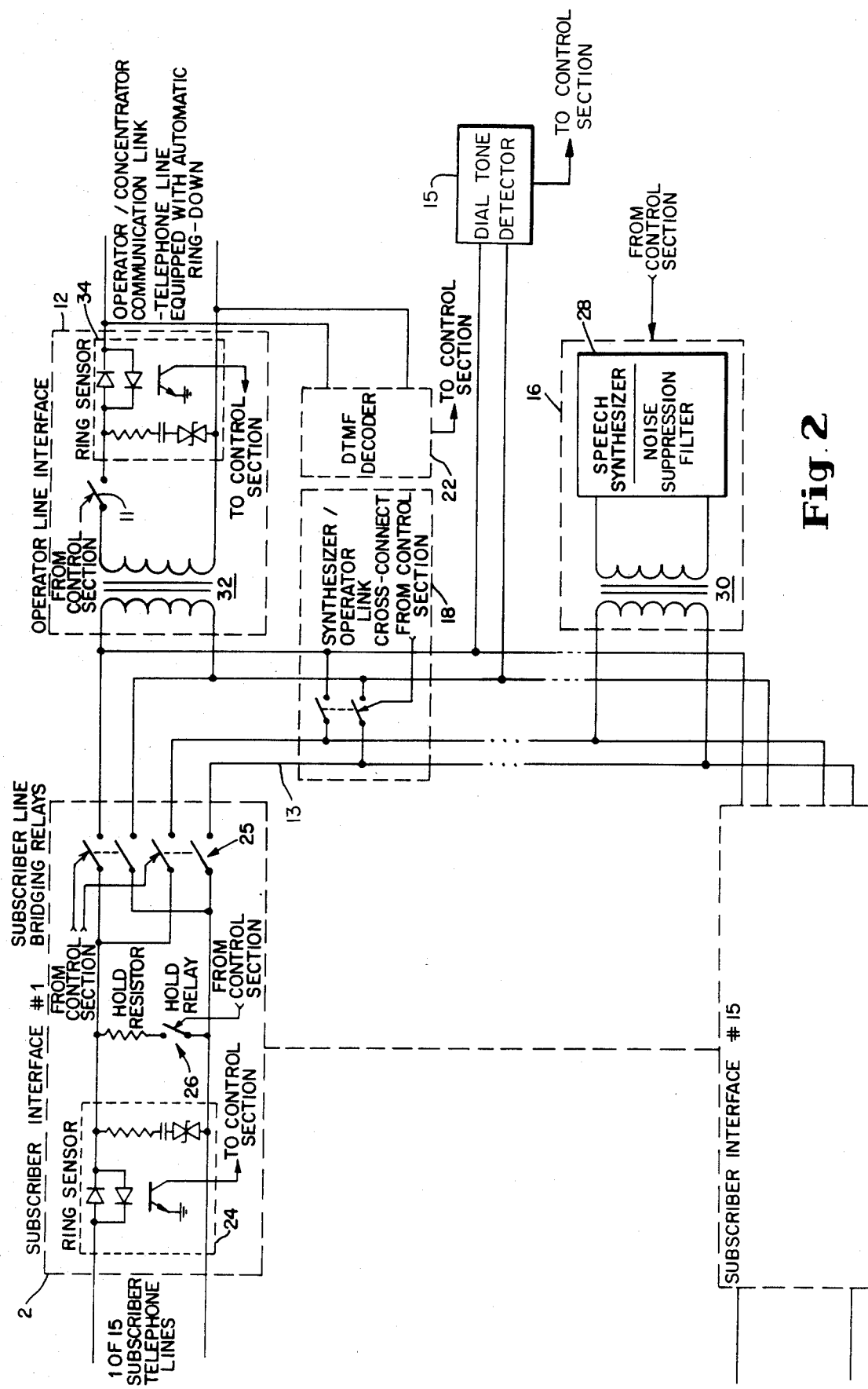
FIG. 2 is a more detailed block diagram of a telephone concentrator shown in FIG. 1.

FIGS. 1-3 illustrate a line concentrator in which an automatic line supervisor in accordance with the first embodiment that is integrally contained. As will be apparent from the detailed discussion of the flow chart of FIG. 4 infra, the automatic line supervisor of this embodiment functions to open the switching means 11 and 25, respectively, within the operator line interface 12 and the subscriber interface 2 without a manual command from the operator at the TAS when either of two conditions are sensed. The first condition occurs when an elapsed time interval (preferably 10 seconds) is sensed during which continuous dial tone is detected on the operator link 13. The dial tone detector 15 is used to detect if a dial tone is present on the operator link 13. The microprocessor 36 has a timing function within its control program (FIG. 4) which senses when the elapsed time interval has occurred. The second condition occurs during programming or testing of the concentrator or during a condition when a call is on hold when an elapsed time interval (preferably 20 seconds) is sensed during which no DTMF tones (manual commands from the operator at the TAS) are detected on the ringing tie line. The DTMF decoder 22 is used to detect if any DTMF tones are present on the ringing tie line 14. The microprocessor 36 has a timing function within its control program (FIG. 4) which senses when the elapsed time interval during which no DTMF tones are present has occurred.

As is known to those persons skilled in telephony, a ringing tie line would not function in the system of FIG. 2 unless switch 11 is open and the TAS is on hook. The concentrator of the telephone answering system is normally located at a location in close proximity to the telephone office to which a plurality of subscriber lines are connected. The concentrator is then connected to each of the subscriber lines to be handled by the telephone answering system through subscriber interfaces such interfaces 2 and 4 shown in FIG. 1. Interface 2 is connected to a subscriber telephone line 6 and interface 4 is connected to subscriber telephone line 8. In the embodiment illustrated in FIGS. 1-3 and discussed herein there are fifteen subscriber lines. Each subscriber line, however, is connected to a separate interface in the concentrator.

If one call is already coupled to the telephone answering station and a new call is received, a message is transmitted to the new caller which message is generated by speech synthesizer 16. As further explained below the speech synthesizer is controlled by the controller 10. In addition, the speech synthesizer 16 is capable of being connected to the ringing tie line 14 through an operator/synthesizer link cross-connect 18 for the purpose of transmitting coded information to the operator for identifying the subscriber line receiving the incoming call to which the operator is going to be connected. In order for the operator to select what information to receive or to place certain calls on hold, coded information is transmitted over line 14 by the operator by the pressing of certain buttons on the operator's push-button phone. Such information is decoded by the DTMF decoder 22. As stated above, the DTMF decoder also is used to detect the presence of tones on the ringing tie line 14 to enable the microprocessor control program (FIG. 4) to generate the command to open switches 11 and 25 at the appropriate time to enable the line concentrator to ring the TAS. The decoded signals are then transferred to controller 10. Similarly, any coded information that is to be sent to the subscriber lines is encoded by DTMF encoder 20 (shown in FIG. 3).

When one of the subscriber lines receives a call, the signal from ring sensor 24 is compared with a threshold level that is stored within one of the memory circuits. The comparison operation is carried out in the microprocessor of controller 10. If the call is to be placed on hold, then a hold relay is closed by controller 10 so as to close hold circuit 26 in the subscriber interface. If the call is to be connected to the TAS, the subscriber line bridging relays 25 and the operator line interface relay 11 are closed in response to signals received from controller 10.

When the call is to be placed on hold, a message is transmitted to the caller. The contents of the message are stored within the memory of the controller 10. The stored message can be either a single message for all subscriber lines or a separate message for each line. When called upon, the stored information transmits appropriate signals to speech synthesizing circuit 16. Circuit 16 includes a speech synthesizer and noise suppression filter 28, which generates the audible message, and a first transformer 30. The audible message is then transferred through the first transformer 30 to the subscriber lines. In order to receive such message, the appropriate relays of bridging relays 25 are closed so that the message is fed back through the subscriber interface to the caller. After the message is transmitted, the relays of bridging relays 25 are opened and holding circuit 26 is closed.

When the operator line is free, the concentrator rings the operator line by the ringing tie line. Once the operator picks up the telephone at TAS, the communication path between TAS and the concentrator is established. The operator then instructs the concentrator on the handling of the call. The control signals sent by the operator are decoded by DTMF decoder 22 which provides the control signals to controller 10.

In order to transmit audible identification information along line 14 to the operator, the controller operates speech synthesizing circuit 16 for formulating the audible information. Such information is then transferred to the lines connected to the operator interface by a link cross-connect 18. This audible information is then transferred by second transformer 32 to ringing tie line 14. After the operator receives the identification code, synthesizer/operator link cross-connect 18 is opened and the appropriate relays of bridging relays 25 are closed for connecting the caller on the subscriber line to be answered to transformer 32 for transmission along single talk line 14 that connects the concentrator to the answering station.

When the operator desires to manipulate or change the status of operation in the concentrator, the operator goes off hook thereby causing ringing of the line which is sensed by ring sensor 34 in the operator line interface 12. Ring sensor 34 then supplies an appropriate control signal to controller 10 indicating that the operator has picked up the line and the concentrator is prepared to receive instructions from the operator.

Figure 4:
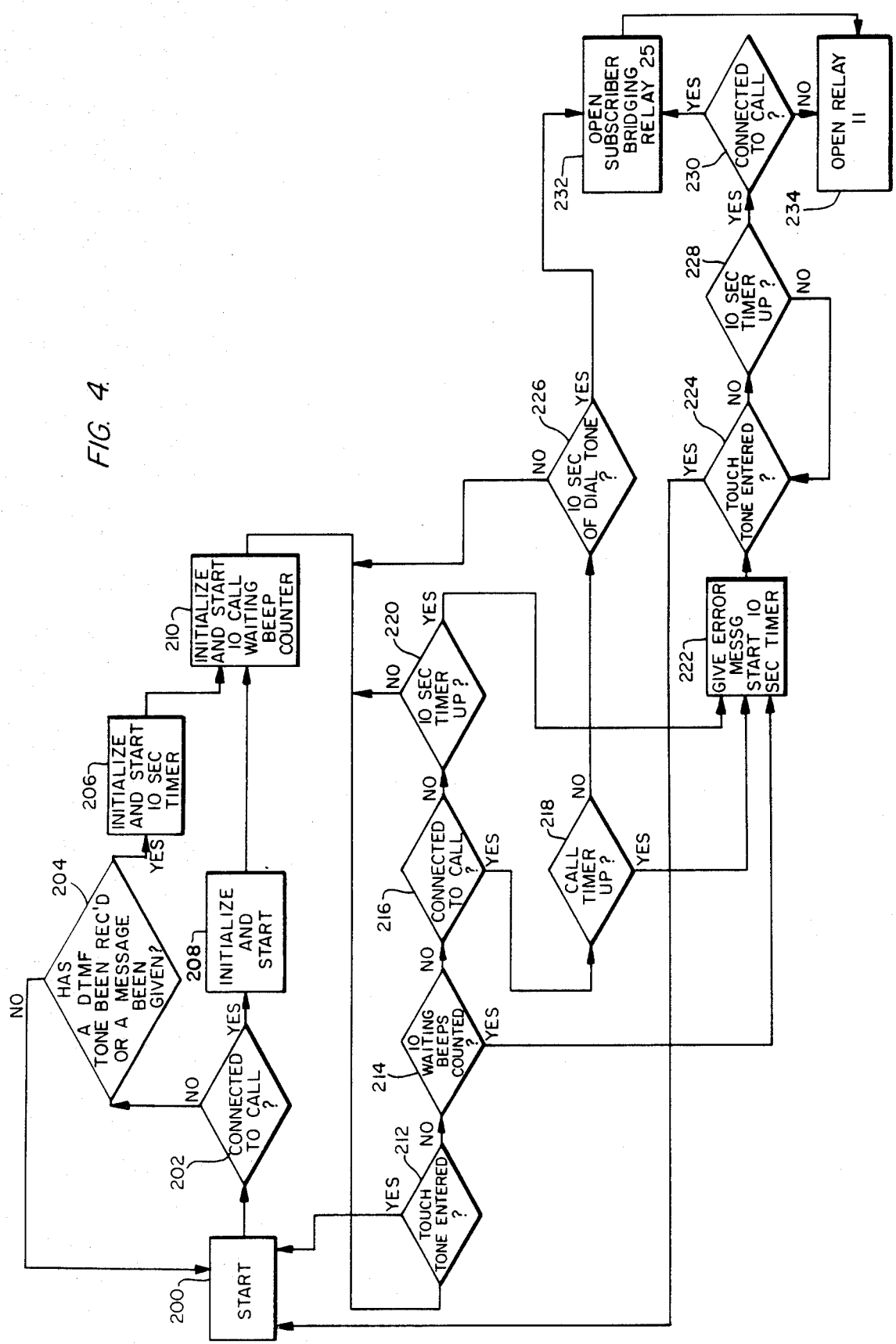
FIG. 4 is a flow chart of the part of the control program for the microprocessor of the controller of FIG. 3 which implements the automatic line supervisor.

Turning to FIG. 3, a more detailed illustration of controller 10 can be seen. All of the operations of the concentrator are basically controlled by microprocessor 36. The microprocessor control program per se with the exception of the parts which are illustrated in FIG. 4 are not part of the invention. Different control programs may be used in the present invention, the preferred one being a combination of the control program used in the aforementioned LEPRECHAUN and the portion of the control program used in FIG. 4. Certain permanent operational procedures are stored in read only memory 38. Other information for controlling the microprocessor and the other equipment in the concentrator is stored in random access memory 40. Exemplary of the type of information stored in random access memory 40 can be the command queue, current relay status, and the ring count threshold (i.e. the number of rings that must occur on any one of the subscriber lines before such line is answered). A power supply, which has not been illustrated in the drawings, supplies power for all the elements in the concentrator. The timing of the operations of microprocessor 36 is controlled by clock 42. Clock 42 also provides signals to programmable counter 44 which can be used for transmitting additional timing information after certain set time periods. In addition, a real time clock 46 can be utilized. All of the various counters and clocks provide different timing signals that can be used by microprocessor 36 as conventional within the art.

Another section of the real time clock 46 serves to interrupt the microprocessor and remind the machine to carry out another operation at set periodic times. This portion of the real time clock is typically utilized as a watchdog timer to ensure that the microprocessor does not remain lost in any particular position but continues to operate.

In order to further ensure proper operation of the microprocessor, a restart control 48 can be employed. Restart control 48 can be either automatically initiated or initiated by the operator. The reference to automatic initiation, generally known as power up restart, refers to the input of a signal for resetting the system when the system has suffered a power failure and power is now starting up again. Alternatively, the operator can call the concentrator to check that the concentrator and the various subscriber lines are working. If the operator calls the concentrator and does not receive an appropriate answer from the concentrator within a certain number of rings then the system will restart automatically. The rings on the operator interface are counted by separate circuitry in the concentrator and if the operator line is not answered by the concentrator this circuitry provides a restart signal. The restarting of the system by restart control 48 puts the system back in its initial position and restarts all of the logic controls. While the microprocessor might have been lost in a certain operation, the restarting of the system will take it out of that operation and reinitiate the entire operating procedure.

When messages are sent via the subscriber line interface or encoded information is to be transmitted to the operator, the microprocessor sends appropriate signals to the speech synthesizer. The speech synthesizer 50 then provides an output through noise suppression filter 52 across transformer 30. The signal going across transformer 30 can be supplied either to the subscriber interface for transmission to the caller or to transformer 32 for transmission of the identification information to the operator. In FIG. 3 the subscriber interfaces are collectively referred to by block 54.

The encoded information from DTMF encoder 20 is supplied to the operator interfaces through transformer 30. Encoder 20 can generate the call waiting signal to be sent over the talk line to the operator or can generate a signal to the operator that a certain code sent by the operator is incorrect. The decoding of information received from the operator line interface 12 is taken off from the output of such interface by DTMF decoder 22. The encoding of information is controlled by microprocessor 36 and similarly the decoded information is input into microprocessor 36.

Several representative operations of the telephone answering system will now be described with reference to the equipment shown in FIGS. 1, 2 and 3. The controller with microprocessor 36 upon instructions from read only memory 38 scans all of the ring sensor circuits for any account activity. When a call is received by subscriber line 2, ring sensor 24 senses the number of rings which are counted by microprocessor 36 and compared to a programmable threshold. When the number of rings have exceeded the certain threshold level, the operator line is seized and upon command of the operator the appropriate relay of bridging relays 25 is closed for connecting the caller on subscriber line 2 to the operator at line interface 12 if the operator is not already busy with a previous call. When the call is to be received by the operator, upon demand by the operator, the controller 10 first transmits coded information generated by speech synthesizer circuit 16 to the operator line interface. The information from speech synthesizer circuit 16 is transferred to transformer 32 by synthesizer/operator line cross-connect 18. After the signal identifying the subscriber line is transmitted along the ringing tie line 14 to the operator, speech/operator link cross-connect 18 is opened and the relays of bridging relays 25 for connecting the call to the operator are closed. The ringing tie line is established between subscriber interface 2 and operator line interface 12 across transformer 32.

If the operator is already busy with a previous call when a new call is received by subscriber interface 2, then the caller will receive a preprogrammed message and be placed on hold. After subscriber interface 2 receives a number of rings above a predetermined threshold with the comparison being made by microprocessor 36, the appropriate relays of bridging relays 25 are closed so that the caller can receive a message from speech synthesizing circuit 16. Speech synthesizing circuit 16 generates the message in response to signals received from microprocessor 36. The signals for generating the message are stored in read only memory 38. After the message has been transferred to the caller, the bridging relays are opened and hold circuit 26 is closed so as to keep the caller on hold until the operator is available. When the operator is subsequently available, upon command by the operator, the identification code will be transmitted to the operator and the connection then made such as in the manner previously discussed above.

FIG. 4 illustrates the portion of the microprocessor control program which implements the automatic line supervision function of the first embodiment of the invention. It should be understood that the flow chart illustrates the control program for two distinct modes of operation of the concentrator, the first being during the answering of calls and the second being when the operator at the TAS is programming the concentrator or it is being tested or a call is on hold. The program proceeds from starting block 200 to decision point 202 where a determination is made if the operator at the TAS is connected to a call or the system is in a programming, testing, or hold mode. If the answer is no at decision point 202, the program proceeds from decision point 202 to decision point 204 where a determination is made if either a DTMF tone has been received or a message has been given. If the answer is no, the program loops back to starting point 200. If the answer is yes, the program proceeds from decision point 204 to block 206 where a 10 second timer is initiated and started. This timer is used to sense when there is an absence of DTMF tones on line 14 for an elapsed time interval. The program next proceeds from block 206 to block 210 where a ten-call waiting beep counter is initialized and started. There is a 6 second interval between each beep so that it takes a total of 60 seconds for the 10 beeps to be counted by the counter that was initialized and started at block 210. A call waiting beep is generated every 6 seconds to signal the operator at the TAS that a call is on hold. If the answer was yes at decision point 202, the program proceeds to block 208 where the call timer is initialized and started. The call timer interval is programmable and may be set to run for a time interval between 5 and 99 minutes. The purpose of the call timer is to define a time interval during which the call concentrator will not initialize a sequence of steps to automatically disconnect the operator from the caller. If the call timer interval runs to completion while the operator at the TAS is on the line with a subscriber, the control program will automatically disconnect the concentrator by opening relays 11 and 25. The program proceeds from block 208 to block 210 which has been previously described as the initialization and starting of the 10 call waiting beep counter. The program proceeds from block 210 to decision point 212 where a determination is made if a DTMF tone has been entered. It should be noted that the paths that are consequent from diverging from decision point 202 are the previously described different modes of operation of the call concentrator. If the answer is yes at decision point 212 that a DTMF tone has been entered, the program branches back to starting point 200 to undertake the previously described operation beginning with decision point 202. The reason that the program branches back to the starting point 200 upon the detection of a DTMF tone by the DTMF decoder 22 in the line concentrator is that any time that a DTMF tone is detected it is assumed that the operator has terminated talking to a caller and is in the process of either preparing the call concentrator to enter a programming, testing or hold mode or is instructing the call concentrator to be in a condition to answer another call. If the answer is no at decision point 212, the program branches to decision point 214 where a determination is made if the 10 call waiting beeps have been counted which were started at the previously described block 210. If the 60 second interval defined by the 10 waiting beeps being counted has not expired, the program proceeds from decision point 214 to decision point 216 where a determination is made of whether or not the operator at the TAS is connected to a call. If the answer is yes at decision point 216, the program proceeds to decision point 218 where a determination is made of whether or not the call time interval which has been initialized at block 208 described supra has elapsed. If the call timer has expired, the program proceeds to block 222 where an appropriate synthesized speech message is given, and a 10 second timer is started. If the answer is no at decision point 216, the program proceeds to decision point 220 where a determination is made of whether or not the timer which was initialized and started at block 206 has expired. If the answer is no, the program loops back to decision point 212 to enter the previously described program steps. If the answer is yes, the program proceeds to the previously described block 222 where an appropriate synthesized speech message and a new 10 second timer is started. The program proceeds from block 222 to decision point 224 where a determination is made of whether or not a DTMF tone has been entered. As has been stated supra, any time a DTMF tone is encountered, it is assumed that a call between the operator and the concentrator has been terminated and therefore, the program proceeds all the way back to starting point 200 to reenter the previously described program steps. If the answer is no at decision point 224, the program proceeds to decision point 228 where a determination is made of whether or not the 10 second timer which has previously been started at block 222 has elapsed. If the answer is no at decision point 228, the program loops back to decision point 224 to again make a determination if a DTMF tone has been entered and either branches back to starting point 200, if the answer is yes, or loops back to decision point 228 if the answer is no. If the 10 second timer has elapsed at decision point 228, the program proceeds to decision point 230 where a determination is made if the operator at the TAS is connected to a call. If the answer is yes, the program proceeds to block 232 where the controller opens the subscriber line bridging relays 25. The program then proceeds to block 234 where the relay 11 in the operator line interface is opened to complete the disconnection of the call concentrator from the caller and the TAS to place the ringing tie line 14 in condition for answering another call. If the answer is no at decision point 230, the program proceeds to block 234 when the relay 11 is opened. If the answer was no at decision point 218 where a determination is made of whether or not the call timer is up, the program proceeds to decision point 226 where a determination is made of whether or not a dial tone has been sensed on the operator link 13 at the input of the dial tone detector 15. The microprocessor continually monitors the output of the dial tone detector for the presence of dial tone. When dial tone is sensed, a 10 second timer is started. If the answer is no, the program branches back to decision point 212 to reexecute the the previously described steps. If the answer is yes at decision point 226, the program proceeds to block 232 which has been previously described to open the subscriber line bridging relays 25 and subsequently open the relay 11 in the operator line interface. After the completion of block 234, the program branches back to other steps in the microprocessor control program which are not described.

Figure 5:
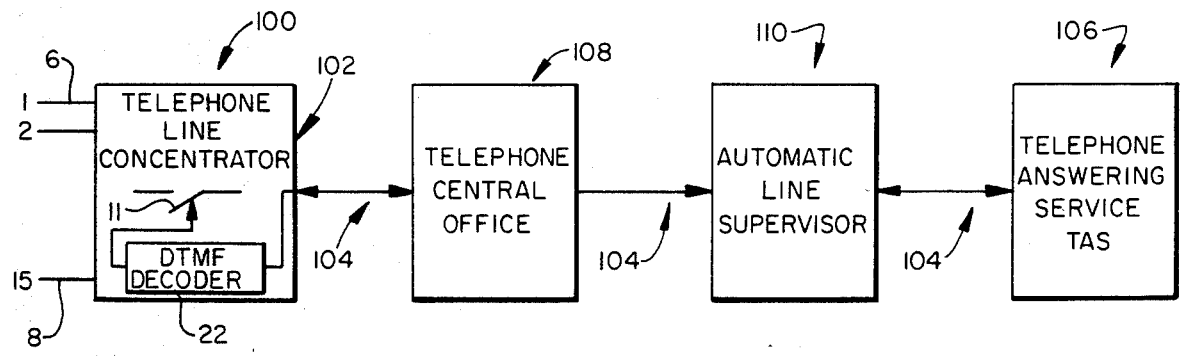
FIG. 5 is a block diagram of a telephone system having an automatic line supervisor in accordance with the embodiment of the invention where it is separated from the line concentrator.

FIG. 5 illustrates a telephone system which includes a second embodiment of an automatic line supervisor in accordance with the invention. The automatic line supervisor in accordance with the second embodiment is implemented as a separate device at the location of the TAS. The system 100 within which the second embodiment is implemented includes a line concentrator 102 which preferably is like that disclosed in Ser. No. 154,914 and commercially sold as the LEPRECHAUN. The telephone line concentrator 102 is connected to the TAS 106 via a ringing tie line 104. As is shown, the ringing tie line 104 runs from the telephone concentrator 102 to the telephone central office 108 and from the telephone central office 108 to the TAS. The automatic line supervisor 110 is connected to the ringing tie line 104 between the telephone central office and the telephone answering service TAS 106.

Figure 6:
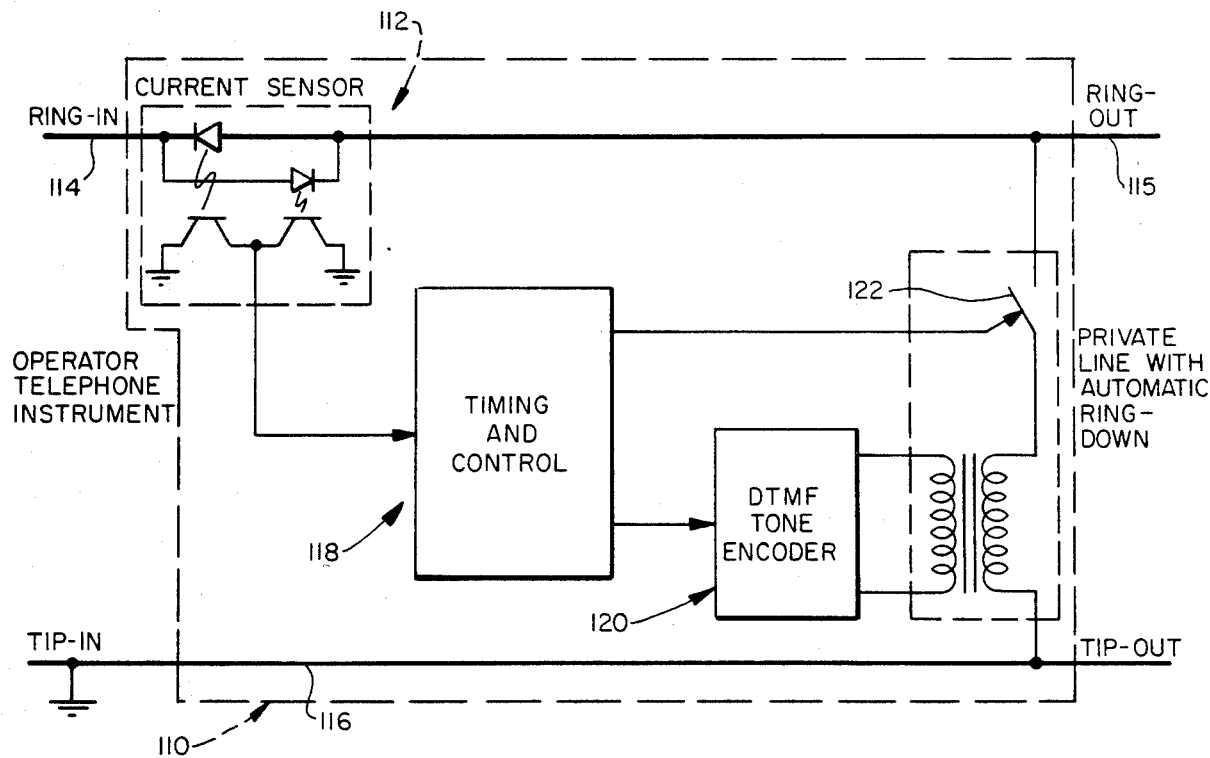
FIG. 6 is a block diagram of the automatic line supervisor of FIG. 5.

FIG. 6 illustrates a block diagram of the automatic line supervisor 110 of FIG. 5. A current sensor 112 is connected to the "Ring-In" line 114. The current sensor 112 functions to produce a control signal when the current flow between the "Ring-In" line 114 and "Tip-In" line 116 is zero. The line 104 has two current flow conditions which are respectively zero current when the operator is on hook and there is an open circuit between lines 114 and 116 and a current flow of a given magnitude which is a function of the impedance of the line when the TAS is off hook. The current sensor produces the control signal when the current magnitude falls below a given threshold which may be effectively zero. The output of the current sensor 112 is connected to a timing and control circuit 118 which functions to key the generation of an audio tone by a DTMF tone encoder 120 and close relay 122 at the appropriate time after the operator at the TAS has gone on hook to inject a tone onto the "Ring-Out" line 115. The tone is transmitted to the telephone line concentrator 102 where it is decoded by a DTMF decoder which may be decoder 22 in the concentrator of FIG. 1. The decoder produces a control signal which is used by the controller 10 of FIG. 3 to open relays 11 and 25 of FIG. 2 to prepare the concentrator to ring the TAS on the ringing tie line 14 as described above.

Figure 7:
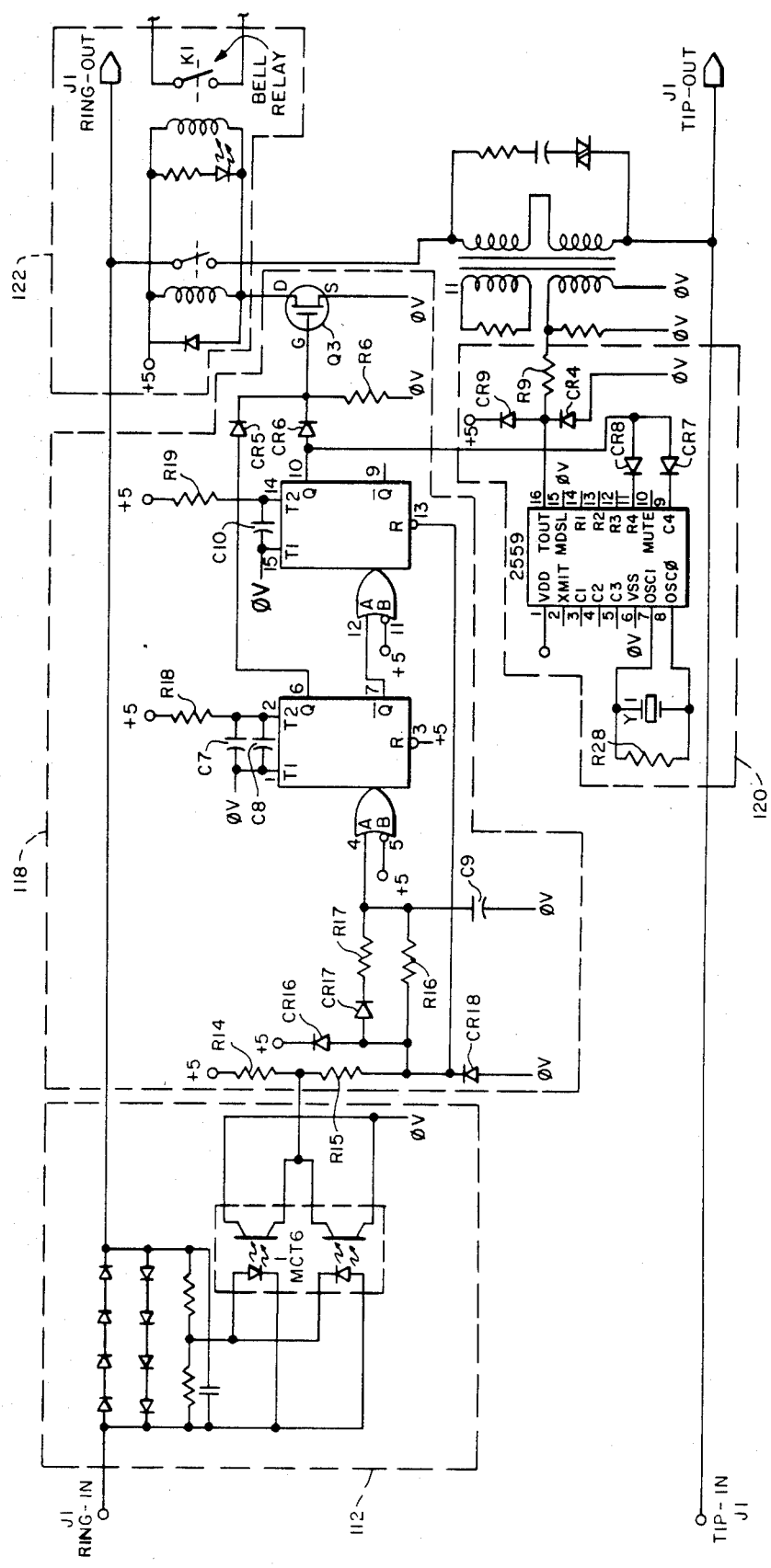
FIG. 7 is a detailed circuit diagram of the preferred form of the automatic line supervisor of FIG. 6.

FIG. 7 illustrates the preferred circuitry used for implementing the block diagram of FIG. 6. The circuitry of FIG. 7 will not be described in detail in view of the fact that it is not necessary to understand or practice the invention and that all of the elements illustrated therein are commercially available. The following identification of exemplary parts, however, is provided:

| Timing and Control 118 | |
|---|---|
| R14 | 10K |
| R15 | 10K |
| CR16 | IN 4148 |
| CR17 | IN 914 |
| CR18 | IN 4148 |
| R17 | 10K |
| R16 | 1 Meg |
| C9 | .47 uf |
| C7 | .1 uf |
| R18 | 820K |
| C8 | .1 uf |
| C10 | 1.2 uf |
| R19 | 680K |
| CR5 | IN 4148 |
| CR6 | IN 4148 |
| R6 | 10K |
| Q3 | VNI0KM |
| Tone Encoder 120 | |
| R28 | 10 M |
| CR8 | IN 4148 |
| CR7 | IN 4148 |
| *-continued* | |
| CR4 | IN 4003 |
| CR9 | IN CR 4003 |

While the invention has been described in terms of its preferred embodiments, it should be understood that numerous modifications may be made to the invention without departing from the invention as defined in the appended claims.

What is claimed is:

1. An automatic line supervisor for use with a call concentrator which concentrates a plurality of incoming telephone lines onto an output which is coupled to a telephone tie line equipped with automatic ring-down running between the call concentrator and an answering service, the concentrator having switching means which upon opening permits disconnection of the call concentrator from the incoming telephone lines and from the telephone tie line to permit the concentrator to ring the answering service, the automatic line supervisor comprising:

(a) means for monitoring the telephone tie line running between the concentrator and the telephone answering service which senses when an operator station at the telephone answering service goes on hook, the condition of the operator station going on hook being sensed by current monitoring means for monitoring the magnitude of current flow in the telephone tie line, and the sensing of the operator going on hook being detected when the magnitude of such current flow drops below a threshold;

(b) means responsive to the means for monitoring for producing a control signal when it is sensed that the operator station has gone on hook, the means for producing a control signal being a tone generator;

(c) a switching means having an input and an output, the input being coupled to the output of the tone generator and the output being coupled to the telephone tie line, the switching means being open when the operator station is off hook at the answering service and closing in response to the sensing of the operator station going on hook, whereby the control signal generated by the tone generator is coupled to the telephone tie line; and, (d) means coupling the control signal to the switching means, the application of the control signal causing the switching means to open.

2. An automatic line supervisor in accordance with claim 1 wherein the tone generator is a DTMF tone encoder.

3. An automatic line supervisor for use with a call concentrator which concentrates a plurality of incoming telephone lines onto an output which is coupled to a communication line running between the call concentrator and an answering service, the concentrator having switching means which upon opening permits disconnection of the call concentrator from the incoming telephone lines and from the communication line to permit the concentrator to ring the answering service, the automatic line supervisor comprising:

(a) means for monitoring the communication line running between the concentrator and the telephone answering service which senses when an operator station at the telephone answering service goes on hook, the condition of the operator station going on hook being sensed by current monitoring means for monitoring the magnitude of current flow in the communication line, and the sensing of the operator going on hook being detected when the magnitude of such current flow drops below a threshold;

(b) means responsive to the means for monitoring for producing a control signal when it is sensed that the operator station has gone on hook, the means for producing a control signal being a tone generator;

(c) a switching means having an input and an output, the input being coupled to the output of the tone generator and the output being coupled to the communication line, the switching means being open when the operator station is off hook at the answering service and closing in response to the sensing of the operator station going on hook, whereby the control signal generated by the tone generator is coupled to the communication line; and, (d) means coupling the control signal to the switching means, the application of the control signal causing the switching means to open.

* * * * *